April 24, 1951  T. A. LA BRECQUE ET AL  2,550,070
METHOD OF MAKING FILTER UNITS
Filed June 29, 1945  3 Sheets-Sheet 1
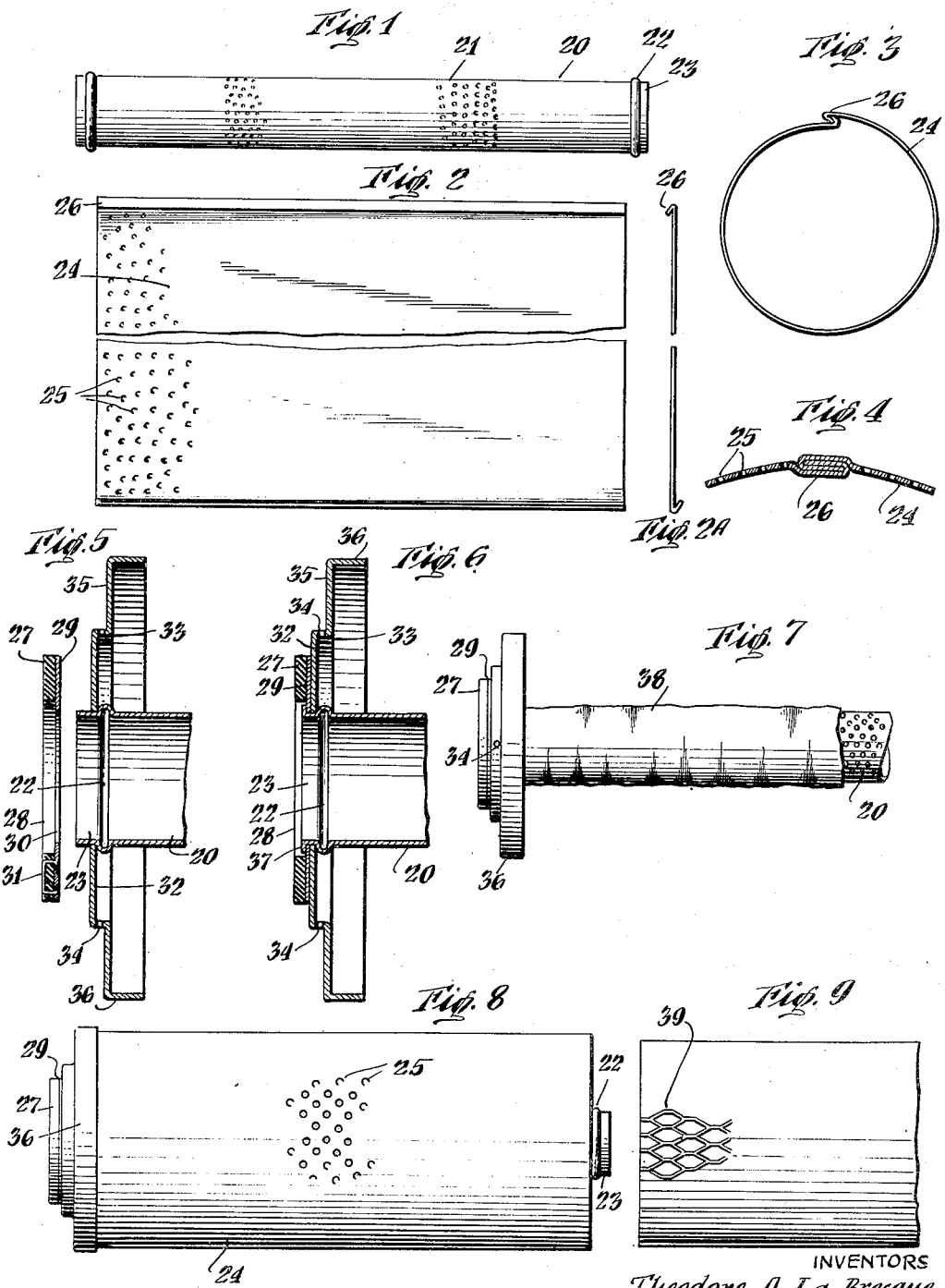
INVENTORS
Theodore A. La Brecque
Eugene H. Proulx
BY Duell, Kane & Smoot
ATTORNEYS April 24, 1951 T. A. LA BRECQUE ET AL 2,550,070
METHOD OF MAKING FILTER UNITS
Filed June 29, 1945 3 Sheets-Sheet 2
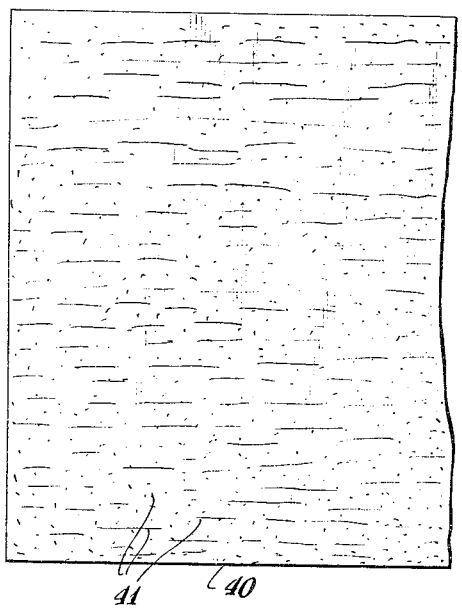
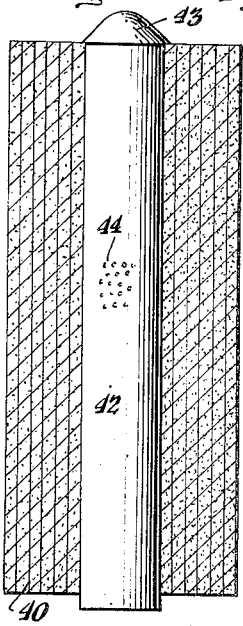
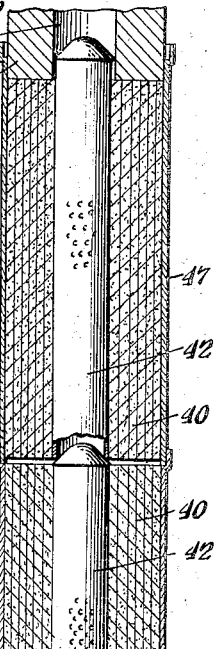
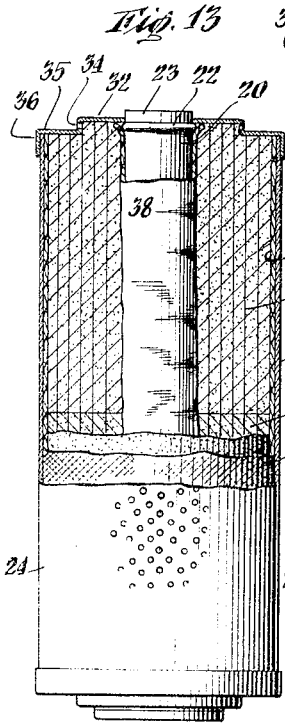
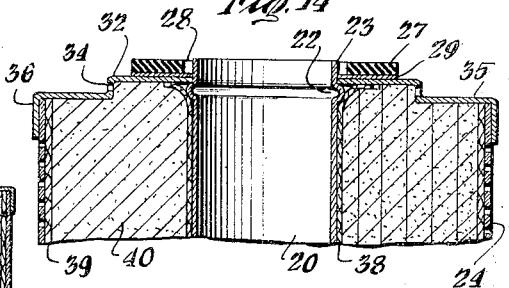
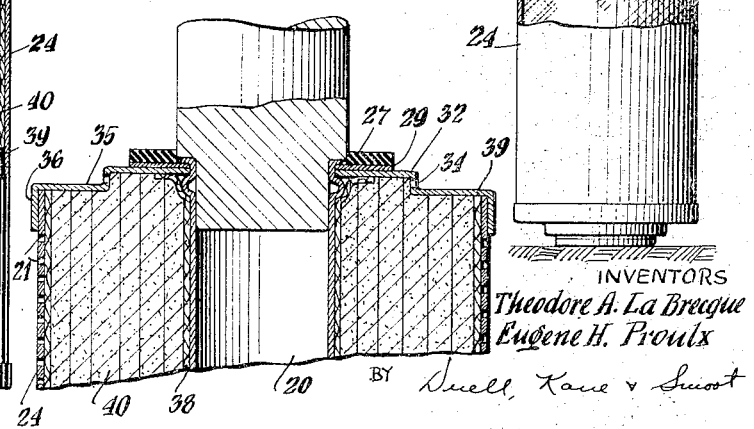
INVENTORS
Theodore A. La Brecque
Eugene H. Proulx
BY Duell, Kane & Smoot
ATTORNEYS April 24, 1951     T. A. LA BRECQUE ET AL     2,550,070
METHOD OF MAKING FILTER UNITS
Filed June 29, 1945     3 Sheets-Sheet 3
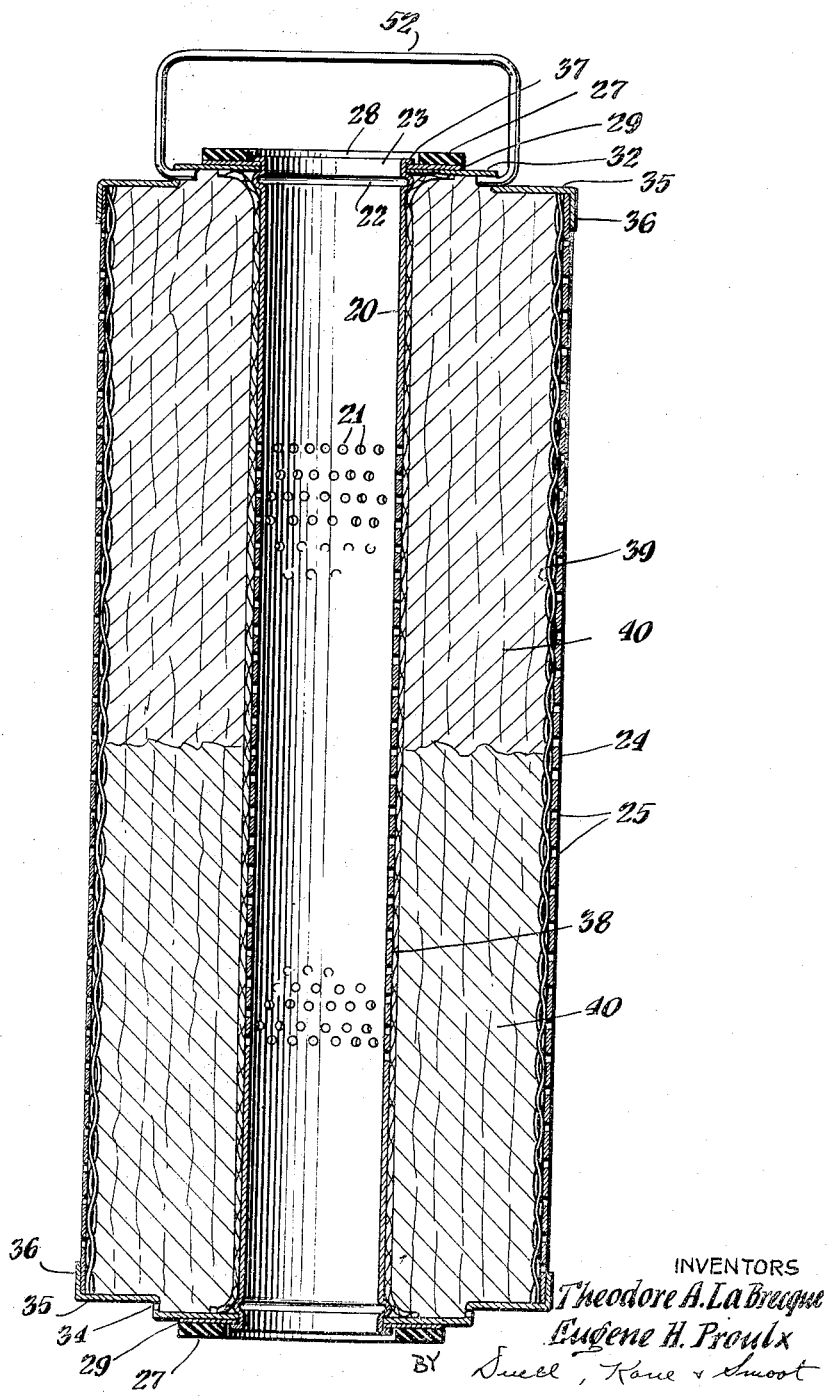
INVENTORS
Theodore A. La Brecque
Eugene H. Proulx
BY Duell, Kane & Smoot
ATTORNEYS Patented Apr. 24, 1951

2,550,070

UNITED STATES PATENT OFFICE 2,550,070

METHOD OF MAKING FILTER UNITS

Theodore A. La Brecque and Eugene H. Proulx, Elmira, N. Y., assignors to The Hilliard Corporation, New York, N. Y., a corporation of New York Application June 29, 1945, Serial No. 602,344

4 Claims. (Cl. 29—148)

This invention relates to a structurally and functionally improved filtering unit as well as a novel method of producing the same.

It is an object of the invention to furnish a unit of this type which will be of particular value when combined with certain encasing apparatus for the purpose of filtering liquids such as oil to remove from the latter foreign material. Such material may, of course, become entrained in the liquid in a number of different manners, it being understood that a filtering unit such as the present is of particular utility when employed, for example, in series with an oil pump such as may be connected with the body of lubricating oil in the crank case of an internal combustion engine; the filtering unit serving to maintain the oil in proper condition for long periods of time.

By means of the present invention, a device of the aforementioned type is provided, and which will present small pores or passages and therefore include more fibers per unit of volume, as well as more pores per unit of volume. Additionally, the filter unit will provide for a higher flow rate at a given pressure drop.

An additional object is that of furnishing a filter which will embrace a material serving to separate foreign particles from a body of liquid and which material may readily be packed or included in the unit to furnish what might be termed a cartridge. Where so disposed, a more uniform pack of material is obtained and less material is required to fill a given space than would otherwise be the case.

A filtering unit constructed in accordance with the present teachings will be extremely resistant to channeling and may be economically manufatcured in accordance with the teachings of the novel method herein traversed, so that it is feasible to provide a discardable unit which will be resistant to channeling even under high flow and pressure conditions.

Still another object is that of teaching a method by means of which a unit such as is herein taught may be economically manufactured in large quantities and by means of relatively unskilled labor and simple machinery.

With these and other objects in mind, reference is had to the attached sheets of drawings illustrating a practical embodiment of the invention, and in which:

Fig. 1 is a side elevation of the tube which preferably forms a part of the finished unit;

Fig. 2 is a face as well as an edge view of the sheet of material which provides the cylinder enclosing or defining unit;

Fig. 3 is an end view of the sheet with its end initially coupled to generally define the cylinder;

Fig. 4 is a fragmentary, enlarged sectional view showing these ends permanently joined;

Fig. 5 is a fragmentary sectional view showing the step of mounting of the washer on the tube and with one of the end plates already disposed on the latter;

Fig. 6 is a view similar to Fig. 5 and showing the washer and end plate assembly permanently secured in position;

Fig. 7 is a fragmentary side elevation of a portion of the unit thus provided and with a layer of material applied to the tube;

Fig. 8 shows the application of the cylinder to the foregoing assembly;

Fig. 9 illustrates in a fragmentary manner a liner of material or lath which is thereupon to be disposed in the cylinder;

Fig. 10 is a fragmentary face view of the material sheet which provides the fibrous mass whereby filtration is achieved; such material being shown in its initial state;

Fig. 11 illustrates this sheet coiled upon a mandrel;

Fig. 12 is a sectional side view showing a pair of these mandrels superposed and in turn mounted upon the assembly as illustrated in Figs. 1 to 9;

Fig. 13 is a side elevation with certain of the parts broken away to disclose underlying constructions and also showing the fibrous material disposed within the cartridge, together with the second end plate mounted thereon;

Fig. 14 is a fragmentary sectional view of the upper end of the unit as shown in Fig. 13 and with a washer in applied position;

Fig. 15 is a similar view illustrating the clamping of the washer and upper end plate in position such that a complete unit is provided; and Fig. 16 is a sectional side view of the complete unit with the bail element mounted thereon.

Referring primarily to Fig. 1, it will be seen that the reference numeral 20 indicates a tube which is preferably formed of thin gauge metal and which has its body portion perforated throughout at least its central zone as indicated at 21. Adjacent its ends, the tube may define outwardly extending beads 22 beyond which end portions 23 are provided. This tube is manufactured in any desirable manner and forms one of the initial units of the assembly.

A cylinder is provided according to the teachings of the present invention by utilizing a sheet of metal 24. This sheet is formed with perforations as at 25; such perforations preferably extending throughout its entire area. As shown in Fig. 2, the sheet 24 is formed with reversely extending flange portions 26. Initially, the sheet is, of course, flat. However, as a first step, the portions 26 are formed on a suitable flanging jig, or apparatus. Thereafter, these portions are engaged as shown at Fig. 3. Finally, by means of a suitable pressure or striking apparatus, the flanges are flattened as in Fig. 4 to interlock the parts and provide a complete cylinder.

A gasket assembly is provided by utilizing a body 27 which may be ring-shaped and formed of suitable material such as composition cork. This body has an opening 28 of a diameter greater than that of the tube 20. A ring 29, which is again formed of any suitable material such as a composition, defines an opening 30 of less diameter than the opening 28 and substantially equal to the exterior diameter of the tube. Staples 31 may serve to secure the body 27 to the ring 29 with outer edges thereof in substantial registry. Accordingly, a gasket assembly is furnished in which, in effect, the ring 29 provides a mounting for and supplements the gasket 27. If the latter rests against a surface and in somewhat sealing relationship with respect thereto, it will be found that the body 27 will in effect be self-centering. This will be because of the floating nature of the support provided by the ring 29.

With a gasket assembly of this type provided, an end plate is applied to the tube. As shown especially in Fig. 5, this end plate may include a central portion 32 defined by an annular flange 33. Within the area of the latter openings 34 are provided for purposes hereinafter brought out. Beyond the flange 33 the plate extends as at 35 and terminates in a final flange portion 36. The diameter of the latter is such that it may receive and retain the cylinder 24.

As also illustrated in Fig. 5, this end plate is provided with a central opening of a diameter slightly in excess of the exterior diameter of the tube 20. Therefore, the plate may be positioned upon the extended end portion 23 of the latter and shifted along the body of the tube until it bears against the bead 22. Following this, the gasket assembly may be mounted upon the extended end portion of the tube. In such mounting, the gasket body 27 extends outwardly. Following this, the end portion 23 is peened or flanged outwardly as indicated at 37 in Fig. 6. In other words, it is caused to extend adjacent and in intimate contact with the face of ring 29 in a zone overlying the inner edge portion of the latter. This will, in turn, force the ring 29 into intimate contact with the central portion 32 of the end plate to again cause that member to firmly bear against the bead 22. Under such circumstances, it will be noted that the gasket body 27 will be flexibly supported by the ring 29 and thus be capable of a certain amount of shifting with respect to the assembly.

It is intended that the perforated area 21 of the tube 20 be covered by a material presenting fine interstices and which will prevent the entrance of any particles of substantial size through the perforations 21. With this thought in mind and as shown in Fig. 7, a sleeve 38 may be mounted upon the tube as the next step of the method herein taught. This sleeve may be termed a "sock" and is conveniently formed of woven material. Its length is substantially more or slightly in excess of the distance between the beads 22 at the opposite ends of the tube 20. Therefore, this sleeve will completely envelope the perforated central zone of that tube. As is apparent, other forms of sleeve or sock might be employed in this connection.

With the parts thus assembled, the cylinder 24 has its end portion introduced into the space defined by the flange 36 of the end plate. This has been shown in Fig. 8. The length of the parts should be such that, with the cylinder so extended, its opposite edge will lie substantially in the zone of the second bead 22. This cylinder will then serve as a jig or fixture to receive, shape, and retain a sheet of material such as metal lath 39. The latter sheet is substantially equal to the overall length of the cylinder and is simply curved so that its ends overlap. With these ends thus loosely disposed, the metal lath unit is projected into the cylinder. The latter will confine the same and incident to its inherent expansive force the sheet of metal lath will lie intimately in contact with the inner face of the cylinder, and with its bonds at an angle thereto.

The receptacle thus provided is to receive a fibrous mass of filtering material. While various types of material might be employed, it is preferred to utilize a mixture of fiber of the redwood tree bark and cotton linters. The proportions employed should be substantially equal quantities of each. The fibers are intermixed and processed to provide a sheet or batt of material such as 40 in Fig. 10. As indicated at 41 in that figure, the fibers should preferably extend parallel to the sheet. The width of this unit is conveniently equal to the distance between the beads 22. Its length should be several times the circumference of tube 20.

The sheet is wound upon a mandrel 42 as in Fig. 11. The windings should not be too tight. The mandrel may be provided with a head portion 43 as well as openings 44 which communicate with its hollow interior. These openings serve to break any suction which might occur if air were not free to flow from the interior of the mandrel to the exterior thereof. It is also to be observed that the head portion 43 of the mandrel is of a configuration such that it may be introduced into and bear against the edges of an opposite end portion of an adjacent mandrel.

As soon as the sheet has been coiled around the mandrel the entire assembly is disposed in a cylindrical container such as 47 in Fig. 12. This container may have a guiding or receiving portion 48 adjacent its upper edge and such that a space is provided which will receive the opposite end portion of an adjacent container. Accordingly, a number of these units 47, together with the coiled sheets and mandrels, may be stacked one upon the other.

To provide a proper degree of density on the part of the filtering material, I prefer to employ two assemblies of sheets or coils and dispose them within the cartridge which furnishes the filtering unit. In other words, a mass of filtering material of a height substantially twice that of the cylinder 24 is disposed within that cylinder.

Therefore, a pair of the containers are mounted one upon the other as indicated in Fig. 12 and disposed below a ram 49 which is provided with a bore 50. The exterior diameter of the ram 49 is such that it may be received slidably within the container 47. The diameter of the bore 50 similarly receives all portions of the mandrel 42. An adapter ring or fixture 51 may serve to receive the lowermost container 47 and support the same upon the upper edge of the cylinder 24. Obviously, although not shown, this cylinder may likewise be supported and rigidified during the packing operation should this prove to be desirable.

With the parts thus disposed and the base of the lower mandrel 42 resting against or overlying and in telescopic relationship with respect to the upper end portion of the tube 20, it is apparent that a projection of the ram 49 will serve to express the spirally coiled sheets 40 from within the containers 47 and into the cylinder 24. This will occur without any interference on the part of the metal lath 39 or its equivalent because the latter will lie in intimate contact with the inner face of the latter cylinder and the delivery end of the fixture 51 will define an opening less than the diameter of layer 39. Therefore, the fibrous mass will be compressed to substantially twice its initial density and will completely fill the cylinder cartridge.

At the same time it will be understood that the individual fibers 41 will continue to lie substantially parallel to each other and concentrically disposed with reference to the tube 20. It has been found that by such expedient most desirable filtering results are achieved. As will be understood, a greater or lesser number of batts might be employed. Also, in certain instances, these might be individually projected into the cartridge. Especially if only a single batt is utilized, then in coiling the latter or otherwise, the mass may be compressed to a proper degree.

Now with a view to sealing the entire structure, the second end plate is applied to the tube 20 as in Fig. 13. Thereafter, and as shown in Fig. 14, a duplicate of the gasket assembly is mounted in position after which the end of the tube is flanged outwardly as indicated at 50. In these several operations, the sock 38 will not be effectively displaced because the latter is preferably of a length slightly in excess of the length of that portion of the tube 20 enclosed between the end plates. Therefore, the sock may be displaced adjacent its ends as indicated in the several latter figures. Consequently, a finished unit of the type shown in Fig. 16 is produced.

Turning to this illustration, in which a complete unit or cartridge has been shown, it will be observed that, following the operation set forth in Fig. 15, a suitable bail unit 52 has been associated with the cartridge by, for example, extending the end portions of the bail into the openings 34 of the upper end plate. Consequently, a convenient carrying and manipulating handle is provided. The central perforated area 21 of the tube 20 extends throughout the major zone of the unit. The sock 38 or other layers enclosing the tube 20 prevent fibers, which might normally become entrained in the body of liquid, from escaping through these perforations 21.

Oil is, of course, free to flow over the outer surface of the cylinder 24 and pass through the openings 25 of the same. It will evenly distribute throughout the entire face of the mass of filtering material incident to the provision of the metal lath or equivalent structure. Such distribution is particularly assured because the bonds of the metal lath preferably extend at an angle to the faces of both the mass of filtering material and the inner face of the cylinder. While this angle need not necessarily be such that a perpendicular relationship is established, it will be adequate to assure the provision of passages such that the oil will be distributed throughout the entire length of the unit. A very effective filtering action is assured incident to the maintenance of the fibers of the filtering body in positions substantially parallel to each other. Also, the assembly may readily be disposed within an encasing apparatus or removed therefrom. It will have a long effective life and during that period will efficiently filter out particles of foreign matter from the body of oil which is passing through it.

Thus, among others, the several objects of the invention as specifically afore noted are achieved. Obviously, numerous changes in construction and rearrangements of the parts might be resorted to and also variations in the steps of the method, as well as their sequence, might be practiced without departing from the spirit of the invention as defined by the claims.

We claim:

1. A method of forming a filtering unit which includes employing a layer of fibrous material with the fibers thereof extending substantially parallel to the edges of the sheet, coiling said sheet to provide a cylindrical body, axially compressing a plurality of said bodies to a portion of their initial height and in a direction transverse to the direction in which the fibers extend, and disposing the compressed mass of filtering material within a perforate cylinder.

2. A method of forming a filtering unit which includes employing a layer of fibrous material with the fibers thereof extending substantially parallel to the edges of the sheet, coiling said sheet to provide a cylindrical body, axially compressing a plurality of said bodies to a portion of their initial height and in a direction transverse to the direction in which the fibers extend, disposing the compressed mass of filtering material within a perforate cylinder, and sealing the end of said cylinder with said material in a substantially maximum condition of compression.

3. A method of forming a filtering unit which includes employing a perforated tube, an end plate, mounting said plate upon said tube, providing a perforated cylinder of a diameter greater than said tube and disposing said cylinder in association with said end plate and concentrically with respect to said tube, employing a sheet of fibrous material, coiling the same to produce a tubular body having an external diameter and length substantially equal to the diameter and length of said perforated cylinder, disposing a plurality of said fibrous tubes in superposed relationship within said perforated cylinder and under consequent compression and thereupon applying a second end plate to close the space between the edges of said first-named tube and perforated cylinder.

4. A method of forming a filtering unit which includes employing a perforated tube, an end plate, mounting said plate upon said tube, providing a perforated cylinder of a diameter greater than said tube and disposing said cylinder in association with said end plate and concentrically with respect to said tube, arranging a layer of metal lath in the form of a cylinder and disposing said layer within and in contact with the inner face of said first-named cylinder, employing a sheet of fibrous material coiling the same to produce a tubular body having an external diameter and length substantially equal to the diameter and length of said perforated cylinder, disposing a plurality of said fibrous tubes in superposed relationship within said perforated cylinder and under consequent compression and thereupon applying a second end plate to close the space between the edges of said first-named tube and perforated cylinder.

THEODORE A. LA BRECQUE.
EUGENE H. PROULX.

REFERENCES CITED

The following references are of record in the file of this patent:

UNITED STATES PATENTS

| Number | Name | Date |
|---|---|---|
| 590,907 | Pendleton, Jr. | Sept. 28, 1897 |
| 1,249,724 | Davis | Dec. 11, 1917 |
| 1,349,112 | Weiss | Aug. 10, 1920 |
| 1,411,975 | Matson | Apr. 4, 1922 |
| 1,872,229 | Blackmore | Aug. 16, 1929 |
| 1,904,931 | Rosenberg | Apr. 18, 1933 |
| 1,913,677 | Kinzel | June 13, 1933 |
| 1,937,415 | Sidney | Nov. 28, 1933 |
| 2,031,797 | Tarbox | Feb. 25, 1936 |
| 2,031,935 | Cuno | Feb. 25, 1936 |
| 2,031,936 | Cuno | Feb. 25, 1936 |
| 2,079,910 | Kamrath | May 11, 1937 |
| 2,128,589 | Manning | Aug. 30, 1938 |
| 2,141,903 | Brundage | Dec. 27, 1938 |
| 2,173,978 | Pennebaker | Sept. 26, 1939 |
| 2,190,305 | Auberschek | Feb. 13, 1940 |
| 2,196,821 | Arnold | Apr. 9, 1940 |
| 2,218,339 | Manning | Oct. 15, 1940 |
| 2,221,465 | Aldham | Nov. 12, 1940 |
| 2,271,054 | Williams | Jan. 27, 1942 |
| 2,341,097 | Heebrink | Feb. 8, 1944 |
| 2,352,732 | Nugent | July 4, 1944 |
| 2,367,745 | Wicks | Jan. 23, 1945 |
| 2,379,508 | Dodge | July 3, 1945 |
| 2,398,284 | Briggs | Apr. 9, 1946 |
| 2,431,431 | Briggs | Dec. 31, 1946 |
| 2,468,862 | Briggs | May 3, 1949 |